United States Patent [19]
Marsh

[11] 3,720,380
[45] March 13, 1973

[54] RECOVERY OF SALVAGEABLE COMPONENTS FROM SOLID WASTE MATERIAL

[75] Inventor: Paul G. Marsh, Hamilton, Ohio
[73] Assignee: The Black Clawson Company, Hamilton, Ohio
[22] Filed: Dec. 21, 1970
[21] Appl. No.: 99,986

[52] U.S. Cl. .................. 241/20, 241/21, 241/24, 241/27
[51] Int. Cl. ............................................. B02c 21/00
[58] Field of Search .......... 241/15, 20, 21, 24, 25, 27, 241/30, 46 R, 46.11, 46.17, 62, 68, 69, 79

[56] References Cited

UNITED STATES PATENTS

| | | | |
|---|---|---|---|
| 2,942,792 | 6/1960 | Anderson et al. | 241/24 X |
| 3,524,594 | 8/1970 | Anderson et al. | 241/24 X |
| 3,565,350 | 2/1971 | Combs | 241/46.17 X |
| 3,604,179 | 9/1971 | Lund | 241/24 X |

Primary Examiner—Granville Y. Custer, Jr.
Attorney—Marechal, Biebel, French & Bugg

[57] ABSTRACT

Glass and aluminum are recovered from a mixture of solid waste, such as municipal waste, by reducing the frangible portions of the waste to a size less than a preselected maximum size, centrifugally treating the reduced portions to divide the glass, aluminum and other inorganics from the fibrous and other organic components, separating the aluminum from the glass and other inorganics, and segregating the colorless glass from the remaining, relatively opaque inorganics.

8 Claims, 2 Drawing Figures

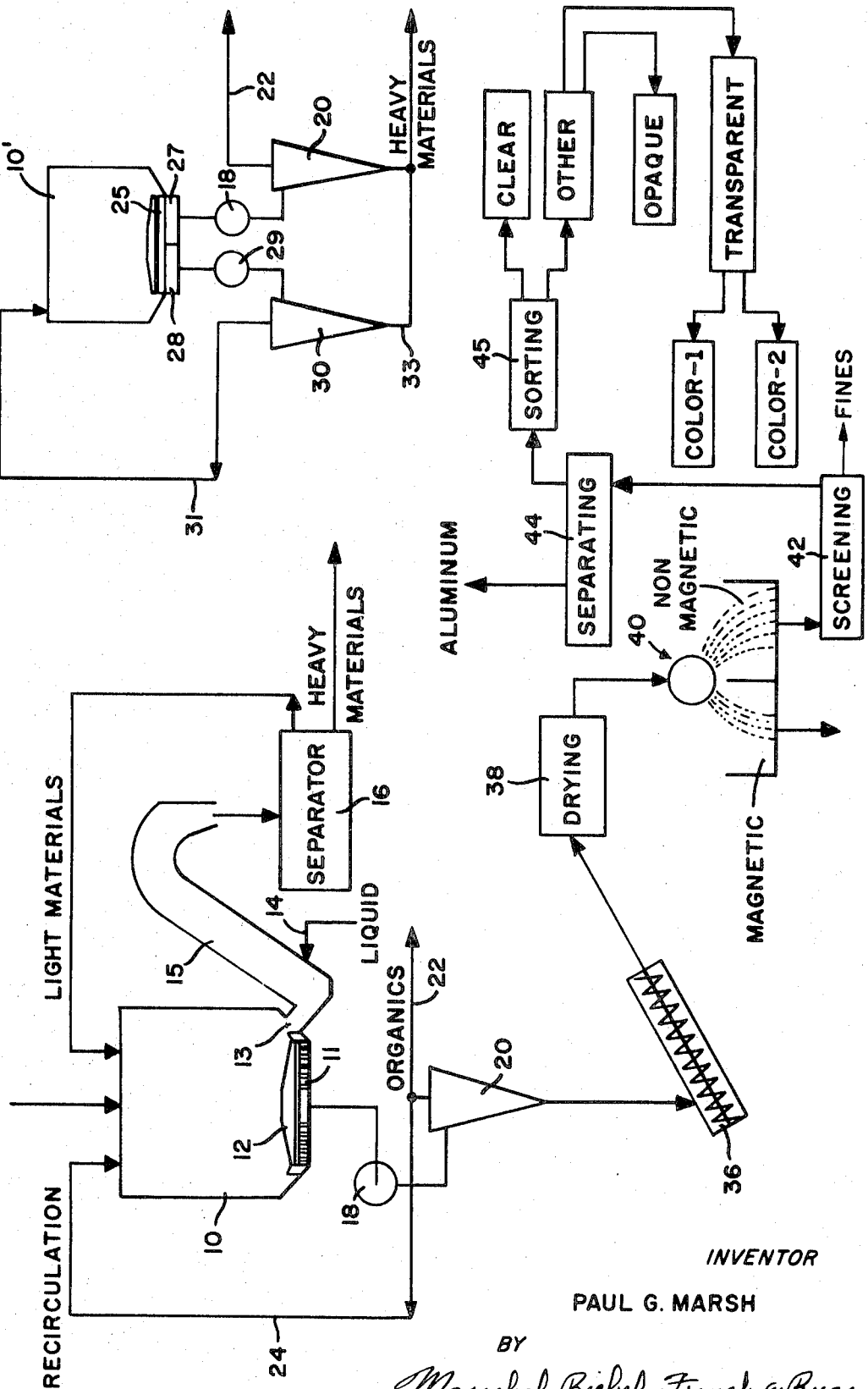

RECOVERY OF SALVAGEABLE COMPONENTS FROM SOLID WASTE MATERIAL

CROSS REFERENCE TO RELATED APPLICATIONS

METHOD OF WASTE TREATMENT, Ser. No. 861,778, filed Sept. 29, 1969 now U.S. Pat. No. 3,595,488; METHOD FOR THE TREATMENT OF GARBAGE AND OTHER WASTE, Ser. No. 6,041, filed Jan. 26, 1970 now U.S. Pat. No. 3,549,092; WASTE TREATMENT AND FIBER RECLAMATION SYSTEM, Ser. No. 94,084, filed Dec. 1, 1970.

BACKGROUND OF THE INVENTION

Solid waste materials of the type exemplified by municipal waste have traditionally presented problems of disposal which have become increasingly critical in recent years as a result of not only a rapidly increasing population but the compounding difficulty of a drastic increase in per capita production of solid waste. Conventionally, such solid waste has been disposed of by such means as incineration and landfill. Obviously, with the ever increasing concern with problems of natural resources and the dwindling supply of acreage suitable for landfill operations within a reasonable distance of population centers, both of these methods of solid waste disposal are becoming less acceptable.

While proposals have been made from time to time for processing solid waste material so that the various components thereof can be reused, a continuing problem with such proposals is the quality of the recovered material, which is often so inferior as to reduce the market value of the recovered components below that which would make such recovery operations commercially attractive or even economically feasible.

For example, although reclaimed glass has a potential value for reuse as cullet in the manufacture of new glass products, a commercially feasible method of reclaiming glass from waste materials in a form suitable for such reuse has eluded the industry. While manual sorting may provide a product which is free from contaminants to an acceptable degree, increased labor costs and the general unavailability of personnel willing to perform this type of work have, as a practical matter, prevented employment of manual sorting on a commercial basis.

It should also be noted that it is desirable to have certain physical characteristics associated with glass which is to be reused as cullet in the glass manufacturing process. Thus glass in powdered or similarly finely divided form is undesirable, both because of the damping effect it has in a glass furnace and also because it tends to be blown away and lost by the currents of gas in the furnace. Additionally, in reclaiming glass from a heterogeneous mixture of other substances, as occurs in the recovery from solid waste materials, the difficulty of separating glass particles from other materials such as dirt and metal becomes increasingly difficult as the particle size is reduced down to, for example, powdered form.

It is also desirable in glass reclamation to minimize the production of glass slivers, that is, particles having a length greatly in excess of the width and depth thereof. Such slivers are undesirable in themselves and also because they tend to break into more or less powder form. Yet many of the waste treatment systems which have been proposed by others include a dry grinding operation in a hammer mill or like device which reduces a high portion of the glass to sliver or powder form. Ideally, therefore, the reclaimed glass particles would be neither extremely small nor extremely large and would be fairly regular in shape, and thus relatively free of glass slivers.

In addition to glass, municipal waste contains substantial quantities of ferrous metals and non-ferrous metals, particularly aluminum in several forms. For example, aluminum is used in many cans, can tops, and linings for food containers and other packages, and large quantities also occur in solid waste as pieces of foil in a variety of thicknesses. The value of reclaimed aluminum is relatively high, and it is desirable to facilitate its recovery in as uncontaminated form as possible in order to obtain the maximum return.

SUMMARY OF THE INVENTION

The present invention provides a system for treating solid waste material so as to recover both glass and aluminum of sufficiently high quality and in forms such that the recovery thereof is not only economically feasible but commercially attractive. As a result, the present invention not only provides a source of high grade glass and aluminum, but the fact that the materials recovered are of sufficiently high quality to command a substantial price acts as an inducement to utilize the system of the present invention in the processing of solid waste materials and thereby encourages the abandonment of more wasteful and possibly atmospherically polluting methods with obvious ecological benefits.

Ideally, the system of the present invention may be used in conjunction with that disclosed in the above noted related application Waste Treatment and Fiber Reclamation System, to provide substantially total recycling of solid waste materials. Thus the system of the present invention enables reclamation of a substantial portion of the valuable glass and aluminum components of the solid waste independently of the ferrous metals, while the system described in the application referred to above provides for recovery of reusable fiber. Any solid materials remaining after the recovery of these valuable components can readily be disposed of utilizing conventional equipment and with virtually no pollution of air, water or land.

Using municipal refuse as an example, although the present invention is applicable to solid waste generally, such waste may typically include about 25 percent liquid and 75 percent solids, the latter including paper, ferrous metals, aluminum and other non-ferrous metals, glass, ceramics, and other organics and inorganics. This mixture is fed into a waste treatment vessel where the major portion of the solids is reduced to a predetermined maximum particulate size in the presence of water.

The remaining, relatively infrangible portion, which constitutes a minor portion of the total solids, is removed separately while the major portion of the solids is removed from the treatment vessel as a slurry of liquid and solids. This slurry is then divided into two fractions, one of which consists primarily of fibers and other organic materials and the other of which consists mainly of glass and other inorganic materials.

The fibrous fraction may be treated by the system disclosed in application Ser. No. 94,084, filed Dec. 1, 1970, for the recovery of valuable fibers therefrom, while the inorganic fraction is treated successively in a series of steps in unique sequence to enable the recovery therefrom of aluminum and relatively uncontaminated glass fragments sorted according to color. As a result, an appreciable portion of the raw refuse is transformed into commercially valuable components, while the remaining material can be disposed of with virtually no pollution of either air, water or land to provide a solution to the increasingly vexing problem of waste disposal and promote conservation of natural resources.

BRIEF DESCRIPTION OF THE DRAWING

FIG. 1 is a somewhat schematic and fragmentary showing of a system for performing the process of the invention; and FIG. 2 is a fragmentary view illustrating a modification of the system of FIG. 1.

DESCRIPTION OF THE PREFERRED EMBODIMENTS

The system of the present invention will be described, for purposes of illustration, in conjunction with the treatment of refuse of the type typified by municipal waste or refuse. In "An Interim Report; 1968 National Survey of Community Solid Waste Practices," U. S. Dept. of HEW, Environmental Control Administration, the typical composition of municipal refuse is given as follows:

| Component | Wet Basis % | Dry Basis % |
| --- | --- | --- |
| Metals | 9 | 11 |
| Glass | 8 | 10 |
| Dirt | 3 | 3 |
| Food Waste | 19 | 17 |
| Plastics | 4 | 5 |
| Yard Waste | 4 | 4 |
| Cloth | 3 | 3 |
| Wood | 2 | 2 |
| Paper | 48 | 45 |

In a similar analysis made by the assignee of the present invention, the constituents of municipal refuse for a particular community were found to be as follows:

| Components | Wet Basis % | Dry Basis % |
| --- | --- | --- |
| Metals, glass and dirt | 20 | 27 |
| Food wastes, cloth and wood | 30 | 20 |
| Paper | 50 | 53 |

Such wastes may comprise on an average 75 percent solids and 25 percent liquids, although the liquid portion has been observed to vary between 20 and 40 percent.

The refuse and an aqueous medium, such as water, are fed into a treatment vessel 10, which may be of the type described in the above noted application Ser. No. 6,041, where frangible portions of the refuse are reduced in the presence of the water or other liquid to a preselected maximum size. This is accomplished by the use of a rotor 12 rotating above a perforated bed plate 11 having perforations therethrough of the preselected maximum size so that as solids are sufficiently reduced in size, by the mechanical and hydraulic shear forces created by the rotor, they pass continuously from the treatment vessel with a portion of the water or other liquid in slurry form for further treatment.

Perforations of uniform size in a range from one-eighth inch to 1½ inches in diameter have been used successfully, and in one embodiment of the invention, the bed plate has one section provided with substantially larger perforations than those in the balance of the bed plate. The smaller perforations are in the range of one-eighth inch to three-fourths inch, and the large perforations in the range from three-fourths inch to 2 inches, with a typical example being one-half inch and 1½ inches respectively.

A second, larger outlet 13 from the treatment vessel 10 communicates downwardly with a junk remover 15 for the removal of relatively large, infrangible solids, such particularly as the majority of ferrous metal pieces. An appreciable portion of the solids contained in the raw refuse deposited in the vessel 10 will usually be removed through the junk remover 15, a typical analysis of this portion being as follows:

| Material | %Based on Portion Removed Through Junk Remover | % Based on Wet Refuse Added to Treatment Vessel |
| --- | --- | --- |
| Glass | 10–40 | 1–4 |
| Magnetic Metal | 50–80 | 5–8 |
| Non-Magnetic Metal | 1–5 | 0.1–0.5 |
| Aluminum | 0.4–2.0 | 0.04–0.20 |
| Brass & Copper | 0.5–2.5 | 0.05–0.25 |
| Lead | 0.1–0.5 | 0.01–0.05 |
| Other (Stones, ceramics, wood, rubber, plastic, etc) | 3–8 | 0.3–0.8 |

It will be noted from the drawings that the liquid added to the treatment vessel, as indicated at 14, is preferably added through the junk remover 15 in countercurrent to the gravity-induced movement of solids through outlet 13 from the treatment vessel, it being understood that the junk remover 15 incorporates conveying means, such as are disclosed in detail in the above U.S. Pat. No. 3,549,092, for carrying such solids upwardly for dumping from the upper end of the junk remover to the separator 16. In addition to cleaning the solids being removed, by washing them free of fibrous and other small particle size materials tending to adhere thereto, this liquid has the important action of carrying back into the treatment vessel through the outlet 13, the pieces of relatively light metal, particularly aluminum, which would otherwise tend to remain with the heavier ferrous metal pieces. This is especially true of aluminum which is present in the form of cans or pieces of foil such that the counterflow of liquid forces them back into the treatment vessel against the forces of gravity which separate out the ferrous metals and like heavies.

As a result of this countercurrent flow back into the treatment vessel, the aluminum tends to remain in the treatment vessel until it has been separated from other heavier metals with which it may be associated, as in composite cans, and retained in the treatment vessel until it has been reduced to a sufficiently small size that it may be extracted from the vessel through the perforated bed plate thereof. Usually the size reduction is effected by wadding or crumpling to forms like a roughly spherical pellet, especially in the case of aluminum sheet as it occurs in cans and foil, and a substantial amount is also cut into relatively small pieces.

Some aluminum and relatively frangible materials such as glass, plaster and paper are removed from the treatment vessel 10 by the junk remover 15 along with the relatively infrangible materials. Preferably, therefore, the material ejected from the junk remover 15 is fed through one or more separation steps to separate the two above noted types of materials. For example, the output from the junk remover may be fed through a magnetic separator from which non-ferrous metals and glass return to the treatment vessel for further treatment. Additionally, or as an alternate to the magnetic separation step, the materials may be subjected to an air separation step to separate relatively light materials from relatively heavy materials, and the lighter materials are recirculated to the treatment vessel. These various separating steps or combinations thereof are indicated diagrammatically at 16 in the drawing, along with the return line 17 for the glass and aluminum to vessel 10.

The relatively frangible solids deposited in the vessel 10, as well as some of the liquid added thereto, are removed in slurry form through the perforated bed plate 11 after they have been reduced in size sufficiently to pass through the perforations in the bed plate. This slurry is delivered by a pump 18 to a centrifugal cleaner 20, which operates to divide the solids in the slurry according to specific gravity. The fibrous material and other organics, which are relatively less dense than glass, metal and other inorganics, are separated from the inorganics for further processing, as indicated at 22, such particularly as for purposes of fiber reclamation as described in the above noted application filed Dec. 1, 1970.

As already noted, it is desirable to control the size of the particles of the inorganics separated from the remainder of the slurry, both to facilitate later sorting operations and to provide, particularly in the case of reclaimed glass, a product which is well suited for reuse. Maximum particle size is controlled by properly sizing the perforations through the bed plate of the treatment vessel 10, but it is also desirable to control minimum size, particularly of the glass particles and other inorganics. This is accomplished according to the present invention by recirculating back to the treatment vessel 10 a substantial portion of the organics separated at the cleaner 20, as indicated at 24. This permits a relatively high flow rate through the treatment vessel, so that the solid materials are not retained in the treatment vessel an extended period of time, which would cause the frangible materials to be broken down to a much smaller size than is desired.

In actual operation, it has been found that the average size of the glass particles varies more or less inversely with the length of time they are in the treatment vessel, but the fibrous particles need a greater reduction in particle size in order to facilitate their recovery at subsequent stations. A desired balance between these objectives is obtained by completely recycling the contents of the vessel 10 at frequent intervals, such as a maximum of about 10 minutes and preferably several times faster such as about every two minutes. These frequencies will result in recycling approximately 20–60 percent of the inorganics from the cleaner 20 to the treatment vessel, with an optimum value being approximately 40 percent.

It has also been noted that minimum particle size can be regulated through control of the speed of the rotor in the treatment vessel. Thus in order to prevent an excess generation of fine materials, it is desirable to operate at relatively low rotor speeds and to utilize a fairly large rotor. Again, in actual operation it has been found that utilizing a 48 inch rotor at speeds of approximately 100 to 300 rpm provides sufficient control of minimum particle size. Utilizing these two control techniques, therefore, minimum particle size can be maintained above one-eighth inch for a major portion of the frangible materials, and generally in a range of one-half to three-fourths inch for the glass when the perforations in bed plate 11 are three-fourths inch to 1 inch in diameter.

An additional feature, and an unexpected result obtained with the present invention, is that the particles of glass produced in the treatment vessel are quite uniform or regular in shape, with few slivers and a ratio of maximum to minimum dimensions of the glass particles of from approximately 1/1 to 2/1. While not completely explained, it is believed that this results from the fact that the glass is broken up while it is submerged in the liquid in the treatment vessel. In any event, the production of fairly regularly shaped glass particles provides a product which is easily handled and readily lends itself to sorting, and the relative freedom from slivers has the further advantage of minimizing the content and production of fine particles and their attendant disadvantages noted above.

The modified system illustrated in FIG. 2 is especially effective for obtaining desired control of particle sizes, particularly with respect to the glass. The treatment vessel 10' in FIG. 2 is equipped with a bed plate 25 having one section provided with substantially larger holes than the remainder of the bed plate, and each of these two sections has separate compartments 27 and 28 directly thereunder. The compartment 27 below the smaller sized perforations is connected as in FIG. 1 to the centrifugal cleaner 20. The other compartment 28 is connected through a pump 29 with a centrifugal cleaner 30, and the lighter materials separated by this cleaner 30, which include much of the large fibrous particles, are recirculated to the treatment vessel as indicated at 31. The heavy materials discharged at the tip of the cleaner are combined, as indicated at 33, with the flow from the tip of the cleaner 20 for further treatment as described hereinafter.

In practice with the modified system illustrated in FIG. 2, the smaller sized perforations should not be greater than about three-fourths inch in diameter, and are preferably near the middle of the range from one-eighth to three-fourths inch. The larger perforations, above the compartment 28, may be in the range of three-fourths inch to 2 inches in diameter, and preferably in the upper portion of this range. Under these conditions, solid materials which are reduced to a particle size sufficient to enter the compartment 27 do not return to the treatment vessel and are carried further in the system as described below. On the other hand, the organic particles which reach the compartment 28 are recirculated through the treatment vessel for further size reduction, but the rate of recirculation should be kept sufficiently high to minimize the time that any given particle remains in the treatment vessel.

A recirculation rate as high as every 2 minutes is not too great, and in any event, the recirculation rate should not be slower than every ten minutes.

The inorganics which are separated out by the centrifugal cleaner 20, together with the output from the smaller end of the cleaner 30 is the system of FIG. 2, are directed to a dewatering device 36 and thence to suitable drying apparatus 38. The inorganics delivered to the cleaner 20 will comprise approximately the following percentages:

| Material | % Based on Portion Delivered to Centrifugal Cleaner | %Based on Wet Refuse Added to Treatment Vessel |
| --- | --- | --- |
| Glass | 70–90 | 7.0–9.0 |
| Magnetic Metal | 1–5 | 0.1–0.5 |
| Aluminum | 1–5 | 0.1–0.5 |
| Ceramics | 1–4 | 0.1–0.4 |
| Other (Bone, Plastic, Remaining non-magnetic metal, etc.) | 5–20 | 0.5–2.0 |

It will be seen, therefore, that the inorganics from dryer 38 comprise mainly non-magnetic materials such as glass, aluminum, ceramics and various other materials. These can be separated as indicated at 40, by a magnetic separator with the magnetic materials being delivered downstream for further processing. While the maximum particle size is controlled by the size of the perforations through the bed plate of the vessel 10, and the minimum size can be controlled to a great extent through the techniques described above, there will nonetheless be some production of fine material. Therefore, the non-magnetics from the separator 40 are then preferably screened, as at 42, to remove the fines.

From the screens 42, the dried inorganic particles within the desired range of particle sizes are separated as indicated at 44 to separate the heavy materials, including the glass and ceramics, from the lighter materials which will consist primarily of aluminum. This is done quite readily by means such as an air cyclone, notwithstanding the relatively close nominal specific gravities of glass and aluminum, because the pieces and pellets of aluminum exhibit an apparent specific gravity considerably lower than glass, by reason of their greater surface areas in comparison with pieces of glass of comparable overall dimensions. Further, the separated aluminum is in very convenient condition for reclamation, and even if it does include minor amounts of other materials, the latter are easily burnt off when the aluminum is melted. Aside from this, it should be noted that it is highly desirable to remove the aluminum from the glass particles since the presence of aluminum detracts from the value of the recovered glass. Therefore, not only is valuable aluminum recovered in the recovery process, but the quality of the recovered glass is simultaneously upgraded.

The unsorted materials from the separator 44 will comprise glass of all kinds, ceramics, bone, plastics, and stones and the like, and they are initially sorted at 45 into two categories. One of these categories will be the clear or colorless glass, sometimes known as flint glass, and the other category will comprise the remaining material including colored glass. Techniques and apparatus for accomplishing this sorting already exist commercially, reference being made to U.S. Pat. No. 3,650,396 to Sortex Company of North America, Inc. and the clear glass can be reused as cullet in the manufacture of new glass. It is contemplated that techniques will soon be perfected for sorting the other category of solids, at least to the extent necessary to separate colored glass from the remaining opaque materials, and thereafter to sort this glass according to color. The reuse value of the opaque materials at the present time is primarily as aggregate or landfill. In fact, the unsorted material from the sorter 45 could be used for either of these purposes without further sorting, and the glass component actually contributes to its utility as aggregate, especially for use with asphalt in road building.

While the apparatus, method and products described herein constitute preferred embodiments of the invention, it is to be understood that the invention is not limited to the precise apparatus, method and product described and that changes may be made therein without departing from the scope of the invention which is defined in the appended claims.

What is claimed is:

1. A method of recovering salvageable components from a mixture of liquid and heterogeneous solid waste materials which include glass, ferrous metal, aluminum and other non-ferrous metal, and fibrous and other inorganic and organic components, comprising the steps of:
   a. simultaneously reducing, in said liquid, portions of said glass, non-ferrous metal, fibrous inorganic and organic components, including a major portion of said glass, fibrous, and non-ferrous metal components, to a preselected maximum particle size;
   b. extracting said reduced portions of said components and some liquid from the remainder of said mixture;
   c. removing from said mixture separately from said extracted portions of said components at least a major portion of said ferrous metal components including the portion thereof greater than said preselected maximum particle size;
   d. dividing said extracted portions into fractions consisting primarily of:
      i. a majority of said reduced fibrous and other organic components, and
      ii. a majority of said reduced glass, metal and other inorganic components; and
   e. removing from said inorganic component fraction a major portion of at least one of said glass and metal components thereof.

2. The method of claim 1 comprising the further steps of separately removing from said inorganic component fraction at least a major portion of the aluminum and glass components thereof.

3. The method of claim 1 wherein said reducing step is performed in a treatment vessel having a downwardly extending outlet for solids larger than said preselected size, and further comprising:
   a. removing at least a major portion of the metal component of said mixture from said vessel by gravity separation through said outlet, and
   b. separating a major portion of the aluminum component of said mixture from the ferrous metal component thereof by applying a countercurrent of liquid through said outlet effective to carry said aluminum portion back into said vessel.

4. The method of claim 1 further comprising the step of controlling the subjection of the glass component of said mixture to said reducing step to a total interval sufficient only to reduce the majority of said glass to particle sizes not substantially smaller than said preselected maximum size.

5. The method of claim 1 wherein said reducing step is performed in a treatment vessel and further comprising the step of recirculating at least a part of said extracted portions to said treatment vessel at a predetermined frequency.

6. The method of claim 1 wherein said reducing step is performed in a treatment vessel and further comprising:
   a. extracting said mixture from said vessel through perforations sized to establish said preselected maximum size;
   b. separating from said extracted mixture a fraction containing a majority of the organic components thereof;
   c. recirculating said separated fraction to said vessel for further subjection to said reducing step; and
   d. performing all of said extracting, separating and circulating steps at a rate sufficient to exchange the contents of said vessel at a frequency of at least approximately ten minute intervals.

7. The method defined in claim 1 wherein said reducing step is performed in a treatment vessel and further comprising the step of recirculating at least a portion of said divided organic components to said vessel for further reducing treatment.

8. The method defined in claim 1 wherein said reducing step is performed in a treatment vessel and further comprising the steps of
   a. recirculating said divided organic components to said vessel,
   b. further reducing said recirculated organic components to particle sizes substantially smaller than said preselected maximum particle sizes,
   c. extracting said further reduced organic components from said vessel, and
   d. conveying said further reduced organic components to another treatment station.

* * * * *